(12) United States Patent
Andruzzi et al.

(10) Patent No.: US 6,377,032 B1
(45) Date of Patent: Apr. 23, 2002

(54) METHOD AND APPARATUS FOR VIRTUAL CURRENT SENSING IN DC-DC SWITCHED MODE POWER SUPPLIES

(75) Inventors: Joseph M. Andruzzi, Raleigh; John Fogg, Apex; William E. Rader, III, Cary, all of NC (US)

(73) Assignee: Semtech Corporation, Newbury Park, CA (US)

( * ) Notice: Subject to any disclaimer, the term of this patent is extended or adjusted under 35 U.S.C. 154(b) by 0 days.

(21) Appl. No.: 09/620,370

(22) Filed: Jul. 20, 2000

(51) Int. Cl.[7] .............................................. G05F 1/613
(52) U.S. Cl. ........................ 323/224; 323/288; 323/290
(58) Field of Search ................................ 323/290, 288, 323/282, 224

(56) References Cited

U.S. PATENT DOCUMENTS 5,481,178 A * 1/1996 Wilcox et al. ............... 323/287
5,627,460 A * 5/1997 Bazinet et al. .............. 323/288
6,057,675 A * 5/2000 Tateishi ....................... 323/283

* cited by examiner

*Primary Examiner*—Shawn Riley
(74) *Attorney, Agent, or Firm*—Thelen Reid & Priest LLP; David B. Ritchie

(57) ABSTRACT

An apparatus and method for virtual current sensing in a DC-DC switched mode power supply. In a fixed frequency implementation, when a switching phase begins, the phase node goes high when the high-side switching transistor is turned on. At this point, a first programmable current source begins charging a current sensing capacitor and the voltage across the capacitor simulates the rising slope of the voltage across a conventional current sensing resistor. Simultaneously, a ramp capacitor beginning at a reference voltage is charged by a second programmable current source. When the sum of the voltages across the two capacitors exceeds an error voltage, the phase node goes low when the drive signal to the transistor is turned off. At this point, a third programmable current source begins discharging the current sensing capacitor and the voltage across the capacitor simulates the falling slope of the current across the conventional resistor.

27 Claims, 7 Drawing Sheets

METHOD AND APPARATUS FOR VIRTUAL CURRENT SENSING IN DC-DC SWITCHED MODE POWER SUPPLIES

BACKGROUND OF THE INVENTION

1. Field of the Invention

The present invention is directed to DC-DC switched mode power converters. More particularly, the present invention is directed to a method and apparatus for providing virtual current sensing capabilities in DC-DC switched mode power converters.

2. The Background

Switched mode DC-DC power converters are common in the electronics industry. They are frequently used to convert one available DC level voltage to another DC level voltage, often needed for a particular set of semiconductor chips. Such power converters generally use one or more electrically controlled switches (such as N- or P-Channel MOSFETs), the gates of which are controlled by a switched mode power supply controller circuit which is often integrated onto a single chip.

A typical synchronous DC-DC pulse-width modulated ("PWM") converter 100 in a step-down buck converter configuration is shown in FIG. 1. A drive signal D generated within control circuitry 110 is routed to drive logic 115, which generates the HI and LO signals. The controller drive logic 115 modulates the HI and LO signals to alternatively turn ON and turn OFF the output transistor switches, $M_{UPPER}$ and $M_{LOWER}$ in switch block 120. This alternate turning ON and OFF of the switches creates a square wave on the SW node, whose duty cycle is equal to $(V_{OUT}/V_{IN})$. Switches $M_{UPPER}$ and $M_{LOWER}$ control the voltage at the phase node, SW. When $M_{UPPER}$ is on, the phase node, SW, is at $V_{IN}$ (a first input voltage). When $M_{LOWER}$ is on, the phase node, SW, is at ground, 130 (a second input voltage).

In the context of the present invention, duty cycle is defined as the ON-time (or pulse width) of a pulse divided by the period of that waveform. As those of ordinary skill in the art will recognize, the square wave on the SW node is averaged by the output filter made up of inductor $L_{OUT}$ and capacitor $C_{OUT}$ to produce an output voltage determined by the expression $V_{OUT}=V_{FB}*(1+(R_1/R_2))$. Ideally, the converter is intended to provide output current up to some preset limit with no change in output voltage. As is well known to those of ordinary skill in the art, the current sense resistor, $R_{SENSE}$, is traditionally used to obtain a voltage $V_{Rsense}=(I_L*R_{SENSE})$, where $I_L$ is the current through the inductor $L_{OUT}$. The voltage across the current sense resistor $R_{SENSE}$ is reported to the control circuitry 110 via the CSH ("current sense high") and CSL ("current sense low") signals. Also, the output voltage $V_{OUT}$ is reported to control circuitry 110 via the CSL signal and the FB signal, which is derived from the voltage divider network formed by resistors R1 and R2. Additional details necessary for practically implementing typical control circuitry 110 are well known to those of ordinary skill in the art, and are not discussed in further detail herein so as not to overcomplicate the present disclosure.

Still referring to FIG. 1, the shape of the voltage waveform across $R_{SENSE}$ is triangular, where the rising slope can be expressed as follows:

rising slope=$R_{SENSE}*(V_{IN}-V_{OUT})/L_{OUT}$

The falling slope of this triangular voltage slope can be expressed as follows:

falling slope=$-R_{SENSE}*(V_{OUT}/L_{OUT})$.

This triangular current signal is summed with an internal ramp signal (for duty cycles >50%) and compared with an output voltage error signal to determine the HI and LO signal modulation. As those of ordinary skill in the art will recognize, this closed loop control scheme for output voltage regulation is known as peak current-mode control.

FIG. 2 is a timing diagram illustrating some of switching waveforms for the circuit of FIG. 1. The D ("drive") waveform alternates between an ON time (e.g., the time between time points 210-A and 212-A in FIG. 2) and an OFF time (e.g., the time between time points 210-A and 212-A in FIG. 2). The time between the rising edge of the ON time (e.g., at time point 210-A shown in FIG. 2) and time rising edge of the next ON time (e.g., at time point 210-B shown in FIG. 2) is defined as a "phase" (or "switching cycle") in the context of the present invention. In a fixed frequency converter, the phase time is determined by an oscillator or other clock source, and the duty cycle is varied to regulate the output voltage, $V_{OUT}$. On the other hand, in a variable frequency converter, the phase time is varied and the ON time typically remains constant to regulate the output voltage, $V_{OUT}$.

Still referring to FIG. 2, the voltage across the phase node, SW, essentially follows the waveform of the drive signal D, and alternates in value between $V_{IN}$ (during the ON time) and ground (during the OFF time). The HI waveform (which controls the $M_{UPPER}$ transistor switch) is essentially 180 degrees out of phase with the LO waveform (which controls the $M_{LOWER}$ transistor switch). As shown in FIG. 2 (with exaggeration, for the sake of explanation) the HI waveform is typically turned OFF slightly before the LO waveform is turned ON to prevent a short circuit or cross conduction condition. Similarly, the LO waveform is typically turned OFF slightly before the HI waveform is turned ON. $V_L$ is the voltage across the primary winding of inductor $L_{OUT}$. $V_L$ switches between $(V_{IN}-V_{OUT})$ (when the HI waveform is ON) and $(-V_{OUT})$ (when the HI waveform is OFF), essentially following the HI signal. $V_{OUT}$ is filtered by output capacitor $C_{OUT}$ producing a DC output equal to $D*V_{in}$ with a small ripple voltage that follows the polarity of the $V_L$ voltage. None of the waveforms are drawn to scale in FIG. 2, and their values/excursions have been exaggerated in some cases for the sake of clearer explanation.

Various alternative implementations for the switch block 120 of FIG. 1 are known to those of ordinary skill in the art, some of which are illustrated in FIG. 3. Referring to FIG. 3, the $M_{LOWER}$ transistor switch may also be implemented as a diode D1 as shown in diagram 120-A, or as a transistor connected as a diode in diagrams 120-B and 120-C. Moreover, many other DC-DC converter configurations using current-mode control are known to those of ordinary skill in the art (e.g., boost converters, Cuk converters, step-up configurations, multiple output configurations, fixed frequency converters, variable frequency converters, etc.). As will be described in more detail later in this document, all of these various configurations may implement the virtual current sensing technique according to aspects of the present invention.

Several disadvantages are associated with the method of inductor current sensing described above with reference to FIGS. 1 and 2. First, the DC value of the voltage across the current sensing resistor $R_{SENSE}$ introduces an output voltage regulation error proportional to DC output current. Second, the signal-to-noise ratio ("SNR") of the AC portion (or slope amplitude) of the voltage across the current sensing resistor $R_{SENSE}$ is low due to switching noise induced from parasitic noise elements in the system. This noise causes inaccuracies in the measured inductor current slope that could result in converter instability and possibly failure. Also, power (having value $P=[I_L^2 * R_{SENSE}]$) is dissipated through the $R_{SENSE}$ resistor, and this reduces the overall converter efficiency.

Another method known to those of ordinary skill in the art for sensing inductor current is to measure the voltage drop across the $M_{UPPER}$ or $M_{LOWER}$ MOSFET (metal oxide semiconductor field-effect transistor) switches when either one is turned ON. This voltage, $V_{DS}$, is equal to the inductor current during the transistor's on-time, $I_{DS}$, multiplied by the on-resistance, $R_{DS(ON)}$, of the transistor. Since different types of MOSFETs have different $R_{DS(ON)}$ values, a reference must be programmed into the controller to interpret the relationship between $V_{DS}$ and $I_{DS}$. This technique exhibits the following disadvantages in terms of inductor current sensing. First, as is known to those of ordinary skill in the art, the $R_{DS(ON)}$ of a MOSFET changes considerably over temperature, and this causes the measurement accuracy of $I_L$ to be highly temperature-dependent. Also, the SNR of the measured $V_{DS}$ is relatively low, due to short measurement time constraints (measuring over a fraction of the total switching period) and switching noise induced from parasitic noise elements in the system. This noise causes inaccuracies in the measured inductor current, which may result in converter instability and possibly failure of the converter.

Thus, a need exists for an improved current sensing technique. The virtual current sensing technique according to aspects of the present invention is intended to eliminate the disadvantages associated with using a current sense resistor or $R_{DS(ON)}$ sensing. These and other features and advantages of the present invention will be presented in more detail in the following specification of the invention and in the associated figures.

SUMMARY OF THE INVENTION

The external current sensing resistor which is typically an essential component of current-mode controlled switched mode power converters is eliminated, and replaced with a virtual current sensing apparatus and method, which may be integrated with PWM controller circuitry. In a fixed frequency implementation, when a switching phase begins, the high-side switching transistor is turned on, causing a phase node to go high. At this point, a current sensing capacitor begins to be charged by a first programmable current source or transconductance amplifier, and the voltage across the current sensing capacitor simulates the rising slope of the traditional triangular current sensing resistor voltage. At the same time, a ramp capacitor is reset to a reference voltage and begins to be charged by a second programmable current source or transconductance amplifier. As part of the normal operation of the power converter, an error amplifier compares a feedback voltage signal, which may be based on a voltage divider and the output voltage of the power converter, with the reference voltage. When a current ramp which is a function of the sum of the voltages across the current sensing capacitor and the ramp capacitor exceeds a current corresponding to the error voltage output of the error amplifier, the drive signal to the high-side switching transistor is turned off, causing the phase node to go low. At this point, the current sensing capacitor begins to be discharged by a third programmable current source or transconductance amplifier, and the voltage across the current sensing capacitor simulates the falling slope of the traditional triangular current sensing resistor voltage. When the switching phase time expires, the high-side switching transistor is again turned on, and the cycle repeats.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to an implementation of the present invention as illustrated in the accompanying drawings. The same reference numbers will be used throughout the drawings and the following description to refer to the same or like parts.

Figure 1:
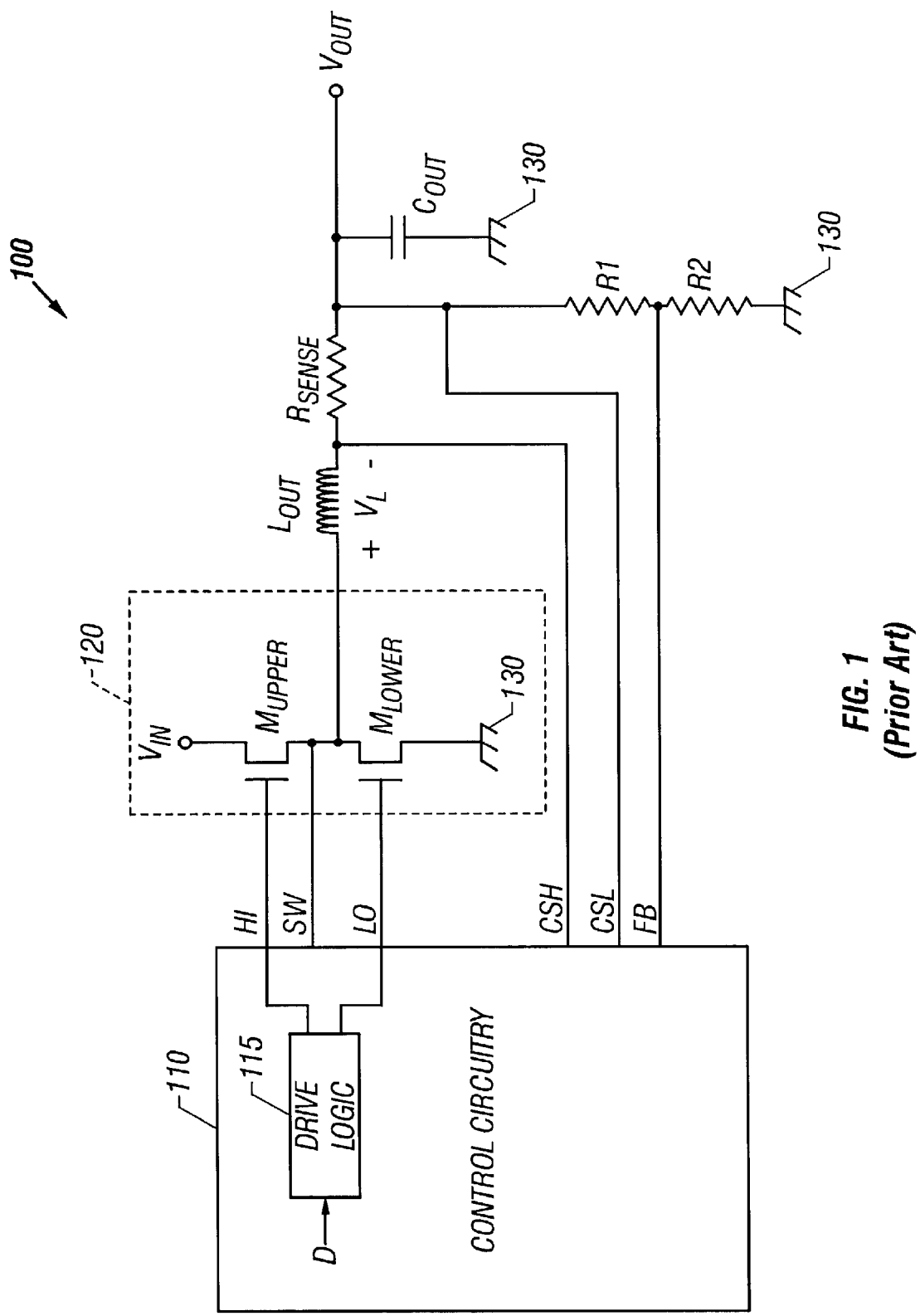
FIG. 1 is an electrical schematic diagram of a typical synchronous DC-DC pulse-width modulated ("PWM") converter in a step-down buck converter configuration.
Figure 2:
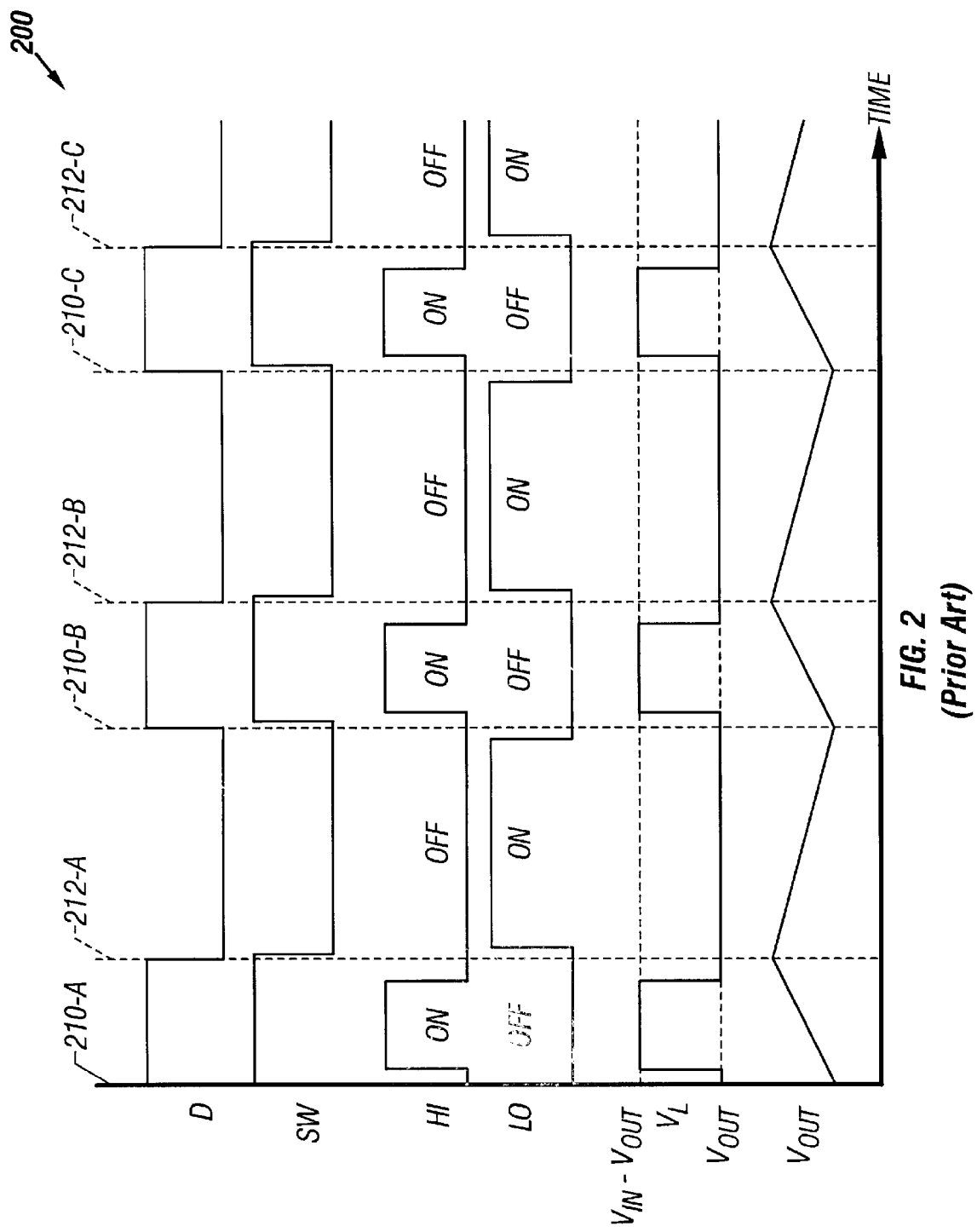
FIG. 2 is a timing diagram illustrating some of switching waveforms for the circuit of FIG. 1.
Figure 3:
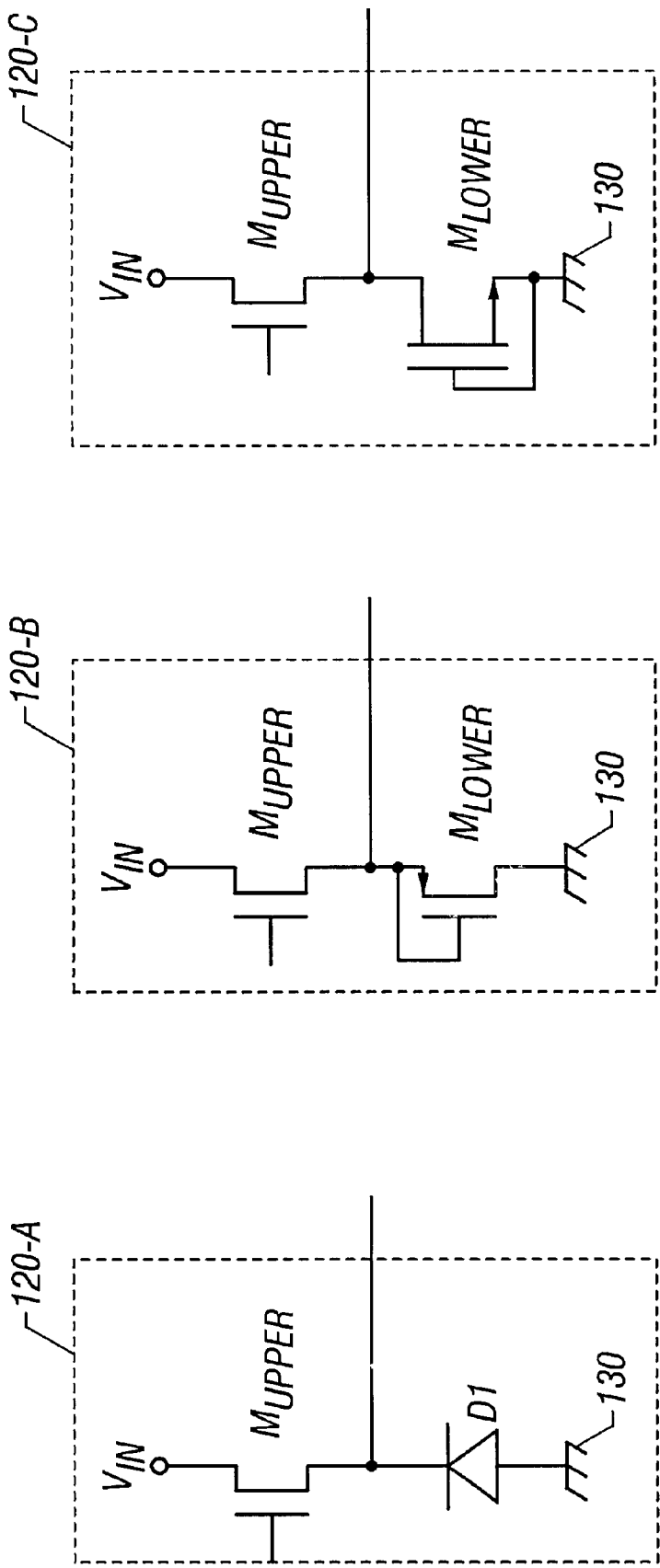
FIG. 3 illustrates schematic diagrams of alternative switch block implementations suitable for use with embodiments of the present invention.
Figure 4:
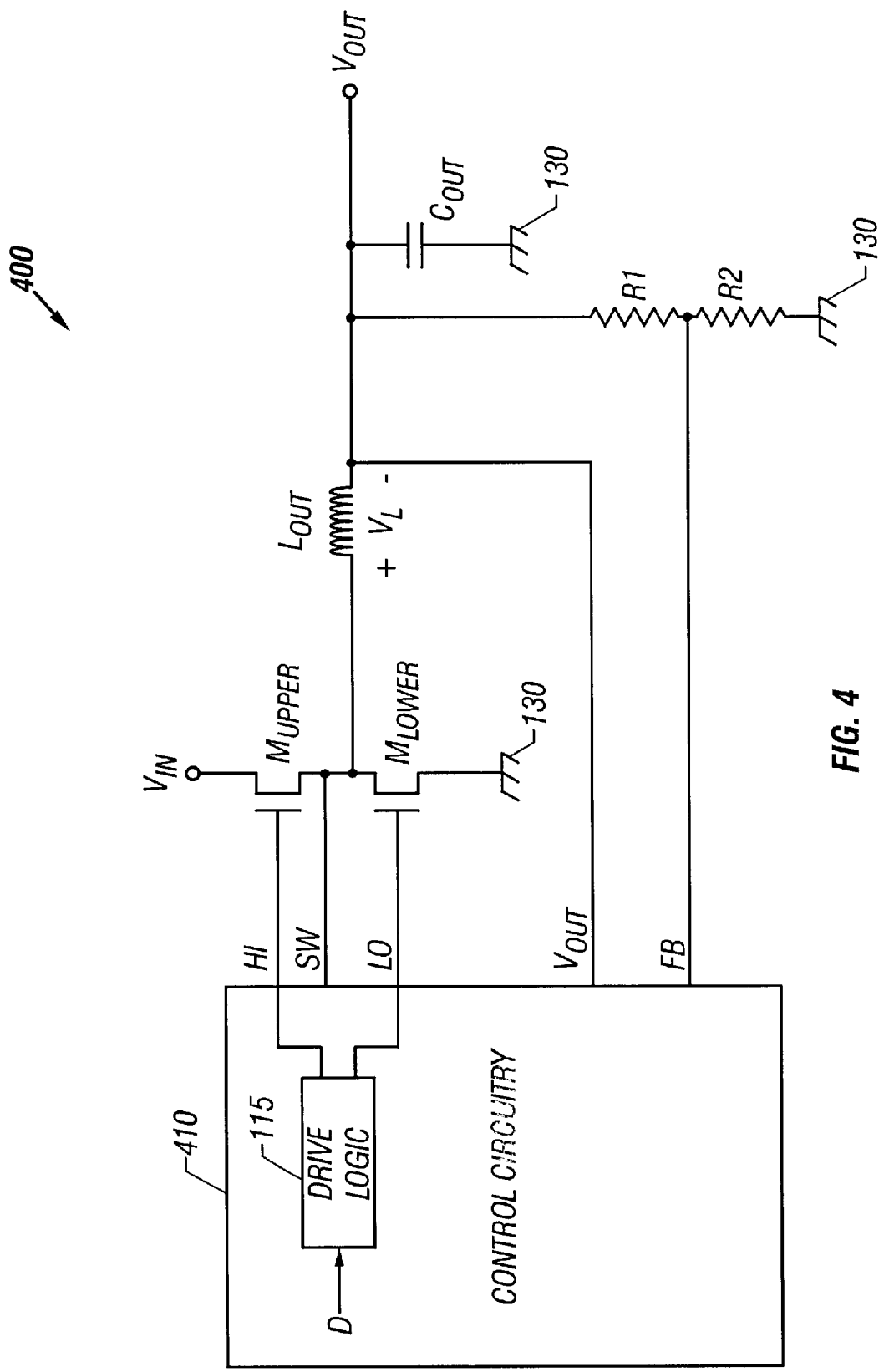
FIG. 4 is an electrical schematic diagram of a synchronous DC-DC PWM converter in a step-down buck converter configuration in one embodiment of the present invention.

FIG. 4 is an electrical schematic diagram of a synchronous DC-DC PWM converter 400 in a step-down buck converter configuration in one embodiment of the present invention. With respect to FIG. 1, the traditional current sensing resistor $R_{SENSE}$ has been eliminated, along with the associated current sensing signals CSH and CSL. Instead, these functional and structural elements are replaced with virtual current circuitry which may be integrated within PWM controller circuitry 410, as will be described in more detail below.

Figure 5:
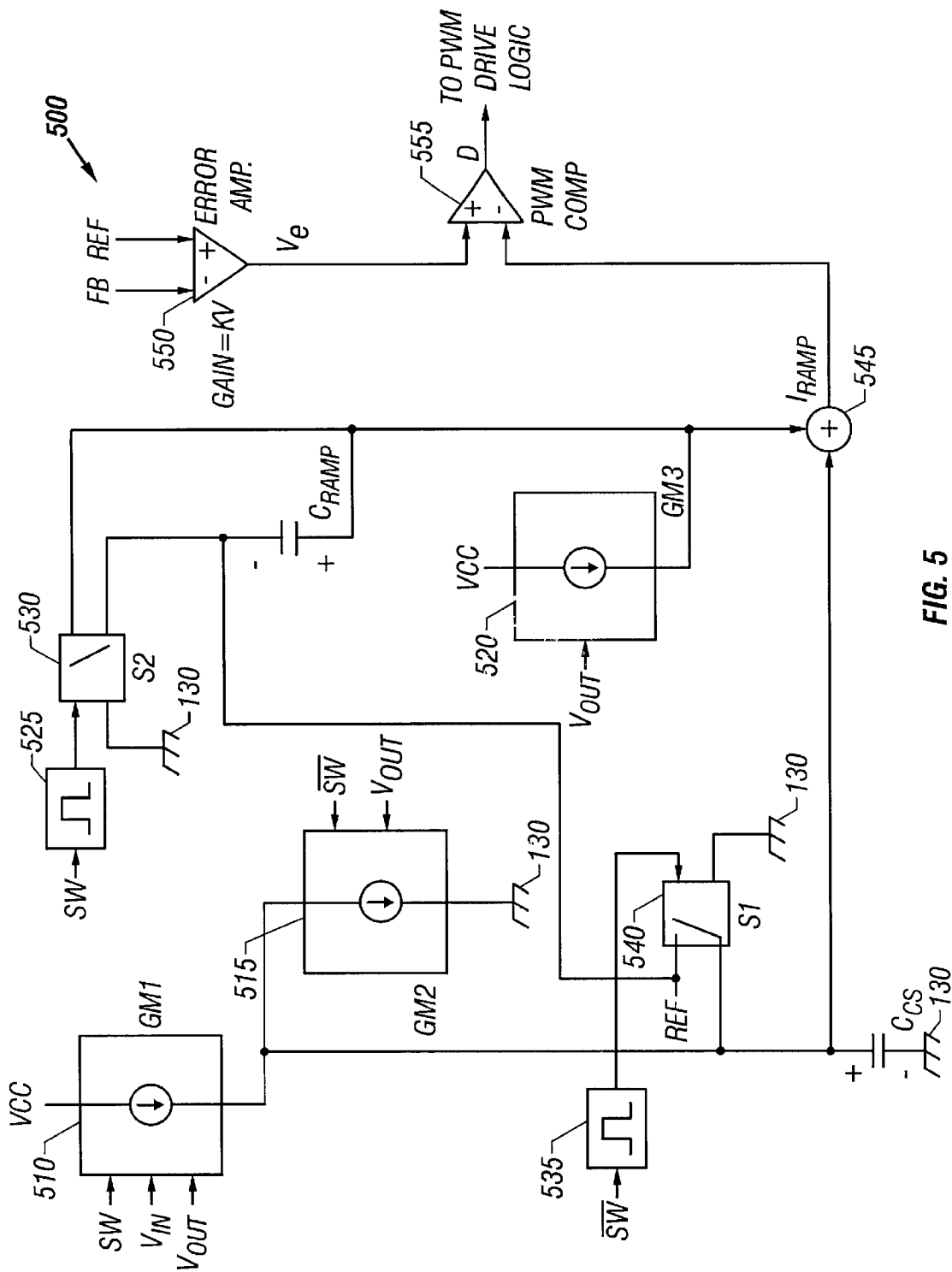
FIG. 5 is a block diagram illustrating virtual current sensing circuitry according to one embodiment of the present invention.

FIG. 5 is a block diagram illustrating virtual current sensing circuitry 500 according to one embodiment of the present invention. As shown in FIG. 5, a current sensing capacitor $C_{CS}$ is alternatively charged by current source 510 and discharged by current source 515. As will be described in more detail below, current source 510 (which may be implemented as a transconductance amplifier) is activated when the SW is high, and generates a current that is a function of $V_{IN}-V_{OUT}$. Current source 515 (which may also be implemented as a transconductance amplifier) is activated when the SW is low, and generates a current that is a function of $V_{OUT}$. An edge triggered one-shot circuit 535 temporarily causes switch 540 to reset the voltage across the current sensing capacitor $C_{CS}$ with every switching cycle.

Still referring to FIG. 5, a ramp capacitor $C_{RAMP}$ is constantly being charged by current source 520, which may also be implemented as a transconductance amplifier and which produces a current that is a function of $V_{OUT}$, as will be described in more detail below. However, at the beginning of each switching cycle, the voltage across ramp capacitor $C_{RAMP}$ is temporarily reset to the reference voltage by a combination of one-shot circuit 525 and switch 530.

The output of summing junction 545 is a current ($I_{RAMP}$) which simulates the current signal traditionally provided the external current sensing resistor, $R_{SENSE}$. The current ramp ($I_{RAMP}$) is a function of the sum of the voltages across the current sensing capacitor and the ramp capacitor.

As part of the normal operation of the power converter 400 (see FIG. 4), an error amplifier 550 within control circuitry 500 compares the feedback voltage signal FB (based on the voltage divider defined by R1 and R2 in FIG. 4) with a reference voltage REF. When the $I_{RAMP}$ signal (which, as mentioned earlier, is proportional to the sum of the voltages across the current sensing capacitor and the ramp capacitor) exceeds the error voltage output of the error amplifier (thus tripping PWM comparator 555), the drive signal to the high-side switching transistor $M_{UPPER}$ is turned off, causing the phase node SW to go low. At this point, the current sensing capacitor $C_{CS}$ is temporarily reset to the reference voltage, and begins to be discharged by current source 515, and the voltage across the current sensing capacitor simulates the falling slope of the traditional triangular current sensing resistor voltage. When the switching phase time expires, the high-side switching transistor $M_{UPPER}$ is again turned ON, and the cycle repeats.

More specifically, with reference to FIGS. 4 and 5, in one embodiment, the virtual current sensing technique according to the present invention generates an internal signal in the controller chip ($I_{RAMP}$) that is an AC representation of the inductor current. A first voltage-controlled current source 510 creates a current proportional to [$V_{IN}-V_{OUT}$] to apply a positive charging ramp on a capacitor, $C_{CS}$, when the output inductor $L_{OUT}$ is energizing during the ON time. When the output inductor $L_{OUT}$ is de-energizing during the OFF-time, a current proportional to $V_{OUT}$ is generated by another voltage-controlled current source 515 applied to $C_{CS}$ to generate a negative discharging ramp. The charging and discharging slopes provided by the current sources 510 and 515 are as follows:

charging slope (generated by current source 510):

$dI_L/dt=(V_{IN}-V_{OUT})/L$, $dV_{Rsense}/dt=K_i^*(V_{IN}-V_{OUT})/L$, $I=C^*dV/dt=C^*K_i^*(V_{IN}-V_{OUT})/L$ discharging slope (generated by current source 515):

$dI_L/dt=-V_{OUT}/L$, $dV_{Rsense}/dt=-K_i^*V_{OUT}/L$, $I=C^*dV/dt=-C^*K_i^*V_{OUT}/L$, where L is chosen to be the typical inductor value used for a given switching frequency, C is the internal capacitor $C_{CS}$, and $K_i$ is the gain, which is selected to provide the right slope for each particular implementation (the particular values selected for these components may be readily determined by those of ordinary skill in the art, and are not described in further detail herein so as not to overcomplicate the present discussion). It should be noted that an embodiment of the present invention may be "programmable" in the sense that a plurality of "L" or other values may be selectable within control circuitry 410 by setting an appropriate configuration pin, programming an internal register, or any other suitable technique.

This synthesized ramp voltage of the internal capacitor $C_{CS}$, is resistively tied back to a reference at the beginning of each OFF-time (see one-shot 535 and switch 540 in FIG. 5) to prevent the ramp from "walking" out of the common mode range of the PWM comparator.

This AC representation of output current is summed with a slope compensation ramp provided by current source 520 and ramp capacitor $C_{RAMP}$ to ensure stability at duty cycles >50%. The slope compensation is $V_{OUT}$-modulated to provide optimal transient and line regulation performance, as follows.

charging slope (generated by current source 520):

$I=C^*(K_i+ESR^*K_v)^*V_{OUT}/L$ $V\text{ramp}=\text{REF}+[T_R^*(K_{i+ESR} \cdot K_V)^*V_{OUT}]/L$, where ESR is chosen to be the maximum capacitor Effective Series Resistance ("ESR") used, $K_V$ is the gain, and $T_R$ is the rise time of the ramp, where these values are selected to provide the appropriate slope for each particular implementation (the particular values selected for these components may be readily determined by those of ordinary skill in the art, and are not described in further detail herein so as not to overcomplicate the present discussion).

Figure 6:
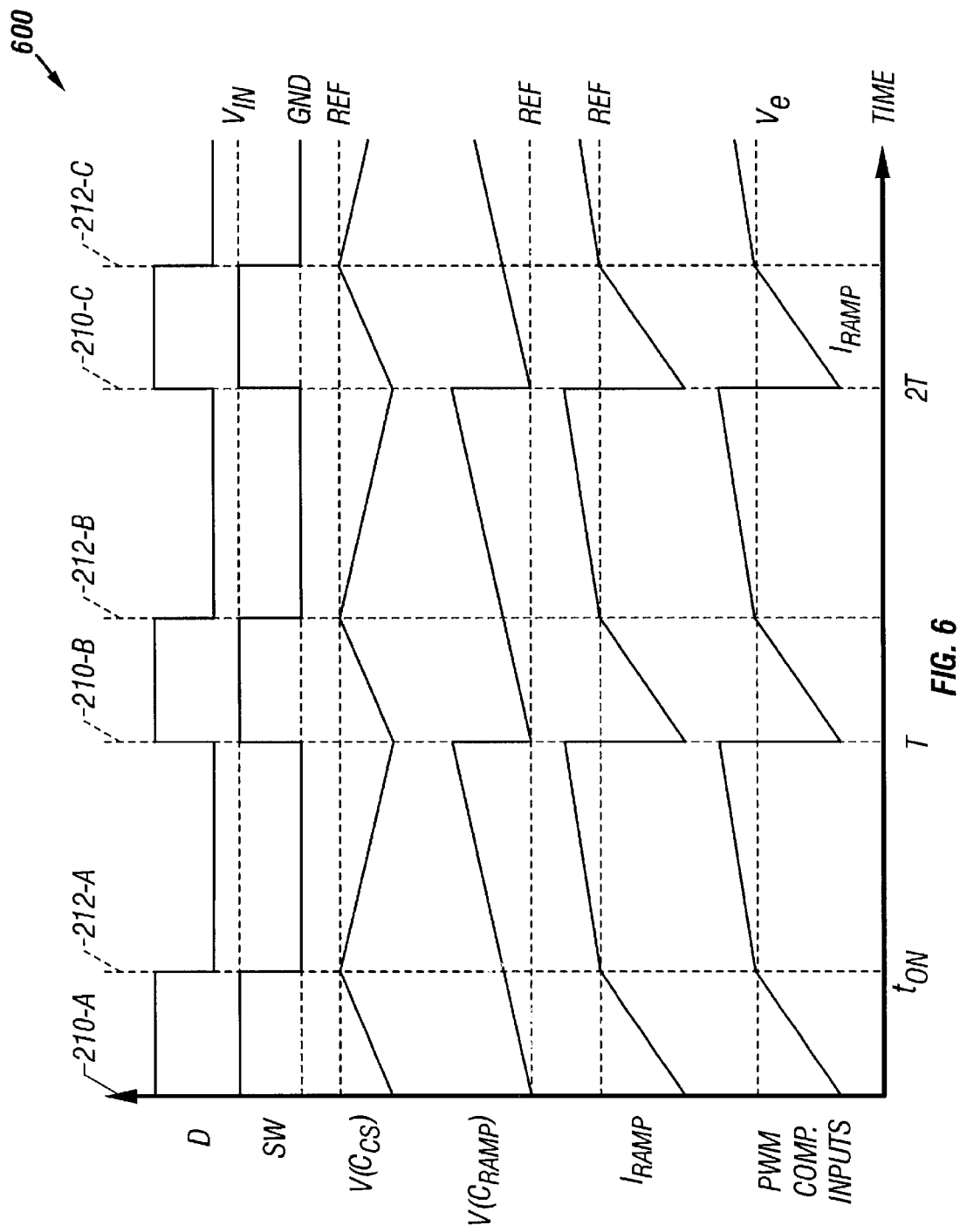
FIG. 6 is a timing diagram illustrating some of switching waveforms for the circuit of FIGS. 4 and 5.
Figure 7:
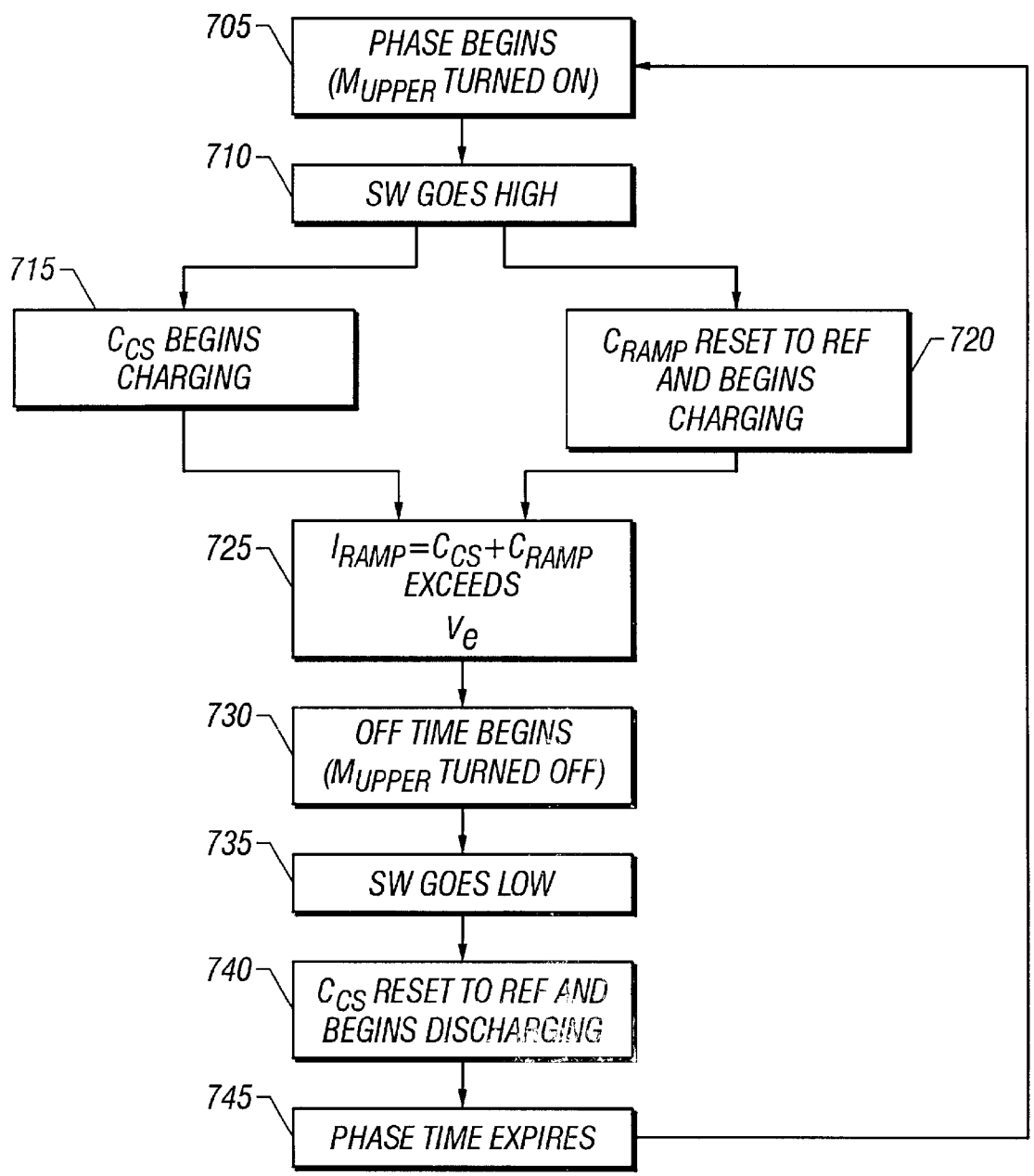
FIG. 7 is a flow chart depicting a virtual current sensing method in accordance with one embodiment of the present invention.

FIG. 6 is a timing diagram illustrating some of switching waveforms for the circuit of FIGS. 4 and 5. These waveforms may be explained with reference to FIG. 7, which is a flow chart depicting a virtual current sensing method in accordance with one embodiment of the present invention. At step 705, the switching phase begins, at which point the upper switching transistor $M_{UPPER}$ is turned ON. This causes the SW signal to go high at step 710 (relative terms such as "high" and "low" in the context of the present invention do not preclude the use of opposite polarities or signal level conventions in alternative embodiments within the scope of the present invention).

When SW goes high at step 710, then at step 715, the voltage across current sensing capacitor $C_{CS}$ begins to rise in accordance with its pre-designed rising slope as shown in FIG. 6. Simultaneously, at step 720, edge-triggered one-shot circuit 525 temporarily causes switch 530 to reset the voltage across the ramp capacitor $C_{RAMP}$ to the reference voltage, and the voltage across ramp capacitor $C_{RAMP}$ begins to rise in accordance with its pre-designed sawtooth ramp as shown in FIG. 6. At step 725, when the current ramp ($I_{RAMP}$) (which is a function of the sum of the voltages across the current sensing capacitor and the ramp capacitor) exceeds the error voltage output of the error amplifier (thus tripping PWM comparator 555), the drive signal to the high-side switching transistor $M_{UPPER}$ is turned OFF at step 730, causing the phase node SW to go low at step 735. At this point (i.e., at step 740), edge-triggered one-shot circuit 535 temporarily causes switch 540 to reset the voltage across the current sensing capacitor $C_{CS}$ to a reference voltage, the current sensing capacitor $C_{CS}$ begins to be discharged by current source 515, and the voltage across the current sensing capacitor simulates the falling slope of the traditional triangular current sensing resistor voltage. When the switching phase time expires at step 745, the process loops back to step 705, at which point the high-side switching transistor $M_{UPPER}$ is again turned ON, and the cycle repeats.

The virtual current sources described in this disclosure could be replaced by simple resistors connected to the phase node. These resistors connected to a filtering capacitor produce sufficient virtual current accuracy for many systems.

The reset function provides improved line regulation as described, but could also be implemented with a high value resistor, which centers the virtual current signal. In some cases it my not be required at all.

The slope compensation capacitor is novel. It is, however, not required for power supplies with duty cycles <50%.

Thus, a technique for virtually sensing output inductor current in a step-down (buck) DC-DC switch-mode power supply has been described. In one embodiment, the technique is used on a PWM controller integrated circuit ("IC") with a peak current-mode control regulation architecture. The technique improves converter efficiency, load regulation, line regulation, and switching noise immunity. Without limitation, the virtual current sensing technique according to aspects of the present invention provides the following advantages. First, less noise is injected into the control loop than with current sense resistors or $R_{DS(ON)}$ sensing techniques. Second, changes in $R_{DS(ON)}$ sensing due to MOSFET processing or temperature changes do not affect the control loop. Third, efficiency is improved by approximately 1% to 2% simply by eliminating the traditional current sensing resistor, since the virtual current sensing technique according to aspects of the present invention is a "lossless" current sensing technique. Fourth, load regulation is improved, since the sensed inductor current no longer contains a DC component. Finally, since the synthesized ramp voltage of the internal capacitor $C_{CS}$ is resistively tied back to a reference at the beginning of each OFF-time to prevent the ramp from "walking" out of the common mode range of the PWM comparator, line regulation is improved, because the feedback voltage FB will also be ideally at the reference voltage, and because frequent resetting of the synthesized ramp voltage makes the current-mode control circuit less sensitive to line voltage changes.

While embodiments and applications of this invention have been shown and described, it would be apparent to those skilled in the art that many more modifications than mentioned above are possible without departing from the inventive concepts herein. For example, many other DC-DC converter configurations using current-mode control known to those of ordinary skill in the art (e.g., boost converters, Cuk converters, step-up configurations, multiple output configurations, fixed frequency converters, variable frequency converters, etc.) may readily employ the virtual current sensing technique according to aspects of the present invention. The invention, therefore, is not to be restricted except in the spirit of the appended claims.

What is claimed is:

1. An apparatus for determining a current through an output inductor in a switching regulator, comprising:
   a first current source activated at the beginning of a switching cycle for charging a current sensing capacitor at a rate proportional to the current through said output inductor;
   a second current source reset to a reference voltage at the beginning of said switching cycle for charging a ramp capacitor;
   a third current source for discharging said current sensing capacitor at a rate proportional to said current through said output inductor, wherein the voltage across said current sensing capacitor is reset to said reference voltage at the end of the duty cycle of said switching cycle; and
   a summing node for generating a current ramp proportional to said current through said output inductor.

2. The apparatus of claim 1, further comprising a comparator for comparing said current ramp to an error voltage generated by an error amplifier.

3. The apparatus of claim 1, wherein said first current source, said second current source, and said third current sources are transconductance amplifiers.

4. The apparatus of claim 2, wherein said first current source, said second current source, and said third current sources are transconductance amplifiers.

5. The apparatus of claim 1, wherein said first current source, said second current source, said third current source, said current sensing capacitor and said ramp capacitor are integrated on a controller integrated circuit for controlling said switching regulator.

6. The apparatus of claim 2, wherein said first current source, said second current source, said third current source, said current sensing capacitor and said ramp capacitor are integrated on a controller integrated circuit for controlling said switching regulator.

7. The apparatus of claim 3, wherein said first current source, said second current source, said third current source, said current sensing capacitor and said ramp capacitor are integrated on a controller integrated circuit for controlling said switching regulator.

8. The apparatus of claim 4, wherein said first current source, said second current source, said third current source, said current sensing capacitor and said ramp capacitor are integrated on a controller integrated circuit for controlling said switching regulator.

9. An apparatus for sensing current through the output inductor of a switching regulator, comprising:
   means for detecting the beginning of a switching cycle in said switching regulator;
   means for charging a current sensing capacitor at a rate proportional to the current through said output inductor;
   means for resetting a ramp capacitor to a reference voltage upon detecting the beginning of said switching cycle;
   means for generating a current ramp proportional to the sum of the voltage across said current sensing capacitor and the voltage across said ramp capacitor;
   means for detecting that said current ramp exceeds an error voltage generated by an error amplifier;
   means for detecting the end of the duty cycle in said switching regulator; and
   means for resetting the voltage across said current sensing capacitor to said reference voltage and discharging said current sensing capacitor at a rate proportional to the current through said output inductor.

10. The apparatus of claim 1, wherein said switching regulator is a step-down switching regulator.

11. The apparatus of claim 1, wherein said switching regulator is a step-down switching regulator in a buck converter configuration.

12. The apparatus of claim 10, wherein said switching regulator is a step-down switching regulator.

13. The apparatus of claim 10, wherein said switching regulator is a step-down switching regulator in a buck converter configuration.

14. A method for regulating an output voltage of a switched mode power converter, the power converter including a first switch controlling current flow from a first voltage source to a phase node, said method comprising:
  during a first period of time,
    closing said first switch;
    initiating the charging of a current sensing capacitor; and
    resetting a ramp capacitor to a reference voltage;
  during a second period of time,
    comparing a voltage feedback signal derived from the output voltage and said reference voltage to generate an error signal; and
    entering a third period of time when a current ramp which is a function of the sum of voltages across said current sensing capacitor and said ramp capacitor exceeds a current corresponding to said error signal;
  and during a third period of time,
    opening said first switch; and
    resetting said current sensing capacitor to said reference voltage by initiating the discharging of said current sensing capacitor at a rate proportional to the current flow to said phase node.

15. A method in accordance with claim 14, wherein said switched mode power converter is a step-down switching regulator.

16. A method in accordance with claim 14, wherein said switched mode power converter is a step-down switching regulator in a buck converter configuration.

17. A method for regulating an output voltage of a switched mode power converter the power converter including a first switch controlling current flow from a first voltage source to a phase node and a second switch controlling current flow from a second voltage source to said phase node, said method comprising:
  during a first period of time,
    closing said first switch;
    opening said second switch;
    initiating the charging of a current sensing capacitor; and
    resetting a ramp capacitor to a reference voltage;
  during a second period of time,
    comparing a voltage feedback signal derived from the output voltage and said reference voltage to generate an error signal; and
    entering a third period of time when a current ramp which is a function of the sum of voltages across said current sensing capacitor and said ramp capacitor exceeds a current corresponding to said error signal;
  and during a third period of time,
    opening said first switch;
    closing said second switch; and
    resetting said current sensing capacitor to said reference voltage by initiating the discharging of said current sensing capacitor at a rate proportional to the current flow to said phase node.

18. A method in accordance with claim 17, wherein said switched mode power converter is a step-down switching regulator.

19. A method in accordance with claim 17, wherein said switched mode power converter is a step-down switching regulator in a buck converter configuration.

20. A switched mode power converter, comprising:
  a first switch controlling current flow from a first voltage source to a phase node;
  means, during a first period of time, for closing said first switch, initiating the charging of a current sensing capacitor, and resetting a ramp capacitor to a reference voltage;
  means, during a second period of time, for comparing a voltage feedback signal derived from the output voltage and said reference voltage to generate an error signal; and
  entering a third period of time when a current ramp which is a function of the sum of voltages across said current sensing capacitor and said ramp capacitor exceeds a current corresponding to said error signal; and
  means, during a third period of time, for opening said first switch and resetting said current sensing capacitor to said reference voltage by initiating the discharging of said current sensing capacitor at a rate proportional to the current flow to said phase node.

21. A switched mode power converter in accordance with claim 20, wherein said switched mode power converter is a step-down switching regulator.

22. A switched mode power converter in accordance with claim 20, wherein said switched mode power converter is a step-down switching regulator in a buck converter configuration.

23. A switched mode power converter, comprising:
  a first switch controlling current flow from a first voltage source to a phase node;
  a second switch controlling current flow from a second voltage source to said phase node;
  means, during a first period of time, for closing said first switch, opening said second switch, initiating the charging of a current sensing capacitor, and resetting a ramp capacitor to a reference voltage;
  means, during a second period of time, for comparing a voltage feedback signal derived from the output voltage and said reference voltage to generate an error signal, and entering a third period of time when a current ramp which is a function of the sum of voltages across said current sensing capacitor and said ramp capacitor exceeds a current corresponding to said error signal; and
  means, during a third period of time, for opening said first switch, closing said second switch and resetting said current sensing capacitor to said reference voltage by initiating the discharging of said current sensing capacitor at a rate proportional to the current flow to said phase node.

24. A switched mode power converter in accordance with claim 23, wherein said switched mode power converter is a step-down switching regulator.

25. A switched mode power converter in accordance with claim 23, wherein said switched mode power converter is a step-down switching regulator in a buck converter configuration.

26. An apparatus for sensing current through the output inductor of a switching regulator, comprising:
  means for detecting the beginning of a switching cycle in said switching regulator;
  means for charging a current sensing capacitor at a rate proportional to the current through said output inductor;
  means for resetting a ramp capacitor to a reference voltage upon detecting the beginning of said switching cycle;
  means for generating a current ramp proportional to the sum of the voltage across said current sensing capacitor and the voltage across said ramp capacitor;
  means for detecting the end of the duty cycle in said switching regulator; and means for discharging said current sensing capacitor at a rate proportional to the current through said output inductor.

detecting that said current ramp exceeds an error voltage generated by an error amplifier;

detecting the end of the duty cycle in said switching regulator; and discharging said current sensing capacitor at a rate proportional to the current through said output inductor.

27. An apparatus for sensing current through the output inductor of a switching regulator, comprising:

means for detecting the beginning of a switching cycle in said switching regulator;

means for charging a current sensing capacitor at a rate proportional to the current through said output inductor;

means for resetting a ramp capacitor to a reference voltage upon detecting the beginning of said switching cycle;

means for generating a current ramp proportional to the sum of the voltage across said current sensing capacitor and the voltage across said ramp capacitor;

means for detecting that said current ramp exceeds an error voltage generated by an error amplifier;

means for detecting the end of the duty cycle in said switching regulator; and means for discharging said current sensing capacitor at a rate proportional to the current through said output inductor.

\* \* \* \* \*

UNITED STATES PATENT AND TRADEMARK OFFICE
CERTIFICATE OF CORRECTION

PATENT NO. : 6,377,032 B1
DATED : April 23, 2002
INVENTOR(S) : Joseph M. Andruzzi, John Fogg and William E. Rader, III It is certified that error appears in the above-identified patent and that said Letters Patent is hereby corrected as shown below:

Column 8,
Line 63, replace "10" with -- 9 --.
Line 65, replace "10" with -- 9 --.

Column 11,
Lines 4-9, please delete "detecting that said current ramp exceeds an error voltage generated by an error amplifier;
  detecting the end of the duty cycle in said switching regulator; and
  discharging said current sensing capacitor at a rate proportional to the current through said output inductor".

Signed and Sealed this

Eighth Day of October, 2002

*Attest:*

*Attesting Officer*

JAMES E. ROGAN
*Director of the United States Patent and Trademark Office*